US008101449B2

(12) United States Patent
Liang et al.

(10) Patent No.: US 8,101,449 B2
(45) Date of Patent: Jan. 24, 2012

(54) PROCESS FOR ALTERING THERMOELECTRIC PROPERTIES OF A MATERIAL

(75) Inventors: Wenjie Liang, Berkeley, CA (US); Allon Hochbaum, Berkeley, CA (US); Melissa Fardy, Berkeley, CA (US); Minjuan Zhang, Ann Arbor, MI (US); Peidong Yang, El Cerrito, CA (US)

(73) Assignees: Toyota Motor Engineering & Manufacturing North America, Inc., Erlanger, KY (US); University of California, Berkeley, Berkeley, CA (US)

( * ) Notice: Subject to any disclaimer, the term of this patent is extended or adjusted under 35 U.S.C. 154(b) by 540 days.

(21) Appl. No.: 12/330,114

(22) Filed: Dec. 8, 2008
(Under 37 CFR 1.47)

(65) Prior Publication Data
US 2009/0293928 A1 Dec. 3, 2009

Related U.S. Application Data

(63) Continuation-in-part of application No. 11/619,413, filed on Jan. 3, 2007, now Pat. No. 7,781,317.

(51) Int. Cl.
*H01L 35/34* (2006.01)

(52) U.S. Cl. ........... 438/54; 438/57; 257/734; 257/741; 257/E29.168; 257/E31.11

(58) Field of Classification Search ............ 438/54, 438/57; 257/14, 734, 741, 746, E29.168, 257/E31.11; 136/201, 205, 224, 236.1, 238–241; 977/762, 896
See application file for complete search history.

(56) References Cited

U.S. PATENT DOCUMENTS

| 6,465,132 | B1 | 10/2002 | Jin | |
|---|---|---|---|---|
| 2010/0015526 | A1* | 1/2010 | Majumdar et al. | ............ 429/215 |
| 2011/0114145 | A1* | 5/2011 | Yang et al. | .................... 136/203 |

FOREIGN PATENT DOCUMENTS

| WO | WO-02/073699 | 9/2002 |
|---|---|---|
| WO | WO-02/080280 | 10/2002 |
| WO | WO-2004/055912 | 7/2004 |

* cited by examiner

*Primary Examiner* — Matthew Smith
*Assistant Examiner* — Walter H Swanson
(74) *Attorney, Agent, or Firm* — Gifford, Krass, Sprinkle, Anderson & Citkowski, P.C.

(57) ABSTRACT

A process for altering the thermoelectric properties of an electrically conductive material is provided. The process includes providing an electrically conducting material and a substrate. The electrically conducting material is brought into contact with the substrate. A thermal gradient can be applied to the electrically conducting material and a voltage applied to the substrate. In this manner, the electrical conductivity, the thermoelectric power and/or the thermal conductivity of the electrically conductive material can be altered and the figure of merit increased.

22 Claims, 6 Drawing Sheets

PROCESS FOR ALTERING THERMOELECTRIC PROPERTIES OF A MATERIAL

CROSS-REFERENCE TO RELATED APPLICATIONS

This application is a continuation-in-part of U.S. patent application Ser. No. 11/619,413 filed on Jan. 3, 2007, which is incorporated herein in its entirety by reference.

FIELD OF THE INVENTION

The present invention is related to a process for altering the thermoelectric properties of a material, and in particular, to altering the thermoelectric properties of a semiconductor material.

BACKGROUND OF THE INVENTION

The importance of sustainable energy resources continues to rise along with worldwide energy demands. Solid-state thermoelectric modules have recently seen an increase in interest due to their ability to convert heat energy into electricity and such materials are desirable to harvest the vast amounts of waste heat produced by combustion-based energy generators.

The efficiency of energy conversion for a solid-state thermoelectric module depends on the dimensionless thermoelectric figure of merit ZT. It is known that the figure of merit can be described by the expression $ZT=\sigma S^2/\kappa T$, where $\sigma$ is the electrical conductivity; S is the thermoelectric power, also known as the Seebeck coefficient; K is the thermal conductivity; and T is the absolute temperature. Although $\sigma$, S and $\kappa$ are interdependent in bulk materials and a ZT of greater than 1 is known to be difficult to achieve, theoretical studies of nanostructured materials suggest that these parameters can be tuned separately in low-dimensional systems. As such, a process for separately tuning, altering or changing $\sigma$, S and/or $\kappa$ for a solid-state thermoelectric module would be desirable.

SUMMARY OF THE PRESENT INVENTION

A process for altering the thermoelectric properties of an electrically conductive material is provided. The process includes providing an electrically conducting material and a substrate. The electrically conducting material is brought into contact with the substrate. A thermal gradient can be applied to the electrically conducting material and a voltage applied to the substrate. In this manner, the electrical conductivity, the thermoelectric power and/or the thermal conductivity of the electrically conductive material can be altered and the figure of merit tuned.

In some instances, the electrically conductive material is a semiconductor material and may or may not have a nanostructure. If the electrically conductive material has a nanostructure, the nanostructure can be a monolithic nanowire, a superlattice nanowire and/or a core-shell nanowire. The substrate can also be a semiconductor material and an insulating layer can be applied to the substrate. The insulating layer can be located between the substrate and the electrically conducting material and the voltage applied to the substrate can be a gate voltage. In addition, a surface of the electrically conducting material can be passivated, for example by applying a coating to the surface and/or by annealing the surface.

DETAILED DESCRIPTION OF THE INVENTION

The present invention discloses a process for altering and/or changing the thermoelectric properties of an electrically conductive material. As such, the present invention has utility as a process for tuning the figure of merit, ZT, for electrically conductive materials.

The process can include providing an electrically conductive material and a substrate. The electrically conducting material can be brought into contact with the substrate and a thermal gradient can be applied to the electrically conducting material and a voltage applied to the substrate. In this manner, the electrical conductivity, the thermoelectric power and/or the thermal conductivity of the electrically conductive material can be altered.

In some instances, the electrically conducting material can be a semiconductor material and may or may not have a nanostructure. If the electrically conductive material has a nanostructure, the nanostructure can be a monolithic nanowire, a superlattice nanowire or a core-shell nanowire. In addition, the electrically conductive material can be any electrically conductive material known to those skilled in the art, illustratively including PbTe, PbSe, SnTe, ZnSb, $Bi_2Te_3$, $Bi_2Se_3$, SiGe, CoSb, $MgSi_2$, ZnO, ZrNiSn, HfNiSn, TiNiSn and combinations thereof.

The substrate can be made from a semiconductor material and an insulating layer can be applied to the substrate such that the insulating layer is located between the substrate and the electrically conducting material and/or both the substrate and the electrically conducting material are in contact with the insulating layer. The voltage applied to the substrate can be a gate voltage.

Passivation of a surface of the electrically conducting material can be included. In some instances, passivation of the surface of the electrically conducting material is afforded by applying a coating to the surface. For example and for illustrative purposes only, an alumina coating, or some other coating with a different chemical composition, can be applied to the surface using atomic layer deposition (ALD), electron beam deposition (EBD), physical vapor deposition (PVD), chemical vapor deposition (CVD) and the like. In the alternative, passivation of the surface of the electrically conducting material may or may not include annealing of the surface.

It is appreciated that the semiconductor material of the electrically conducting material and/or of the substrate can be an n-type semiconductor or a p-type semiconductor.

Figure 1:
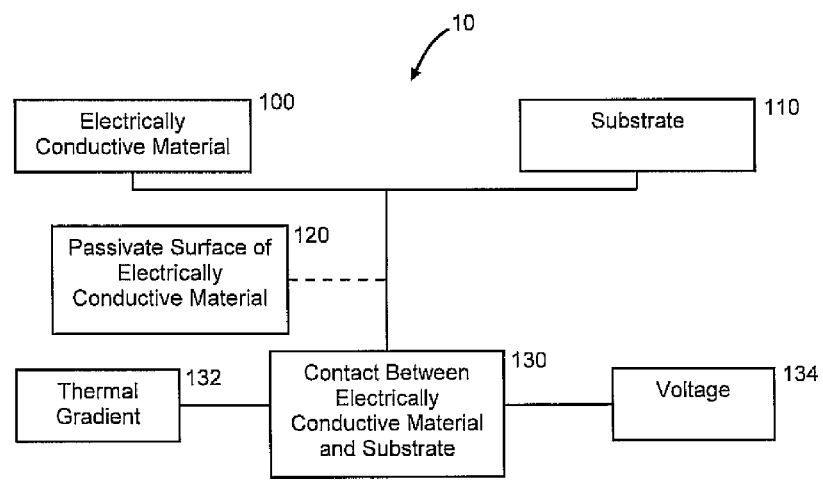
FIG. 1 is a schematic diagram illustrating a process according to an embodiment of the present invention.

Turning now to FIG. 1, a process for altering the thermoelectric properties of an electrically conductive material is illustrated generally at reference numeral 10. The process 10 can include providing an electrically conductive material at step 100 and a substrate at step 110. Optionally, the surface of the electrically conductive material can be passivated at step 120. The electrically conductive material and the substrate can be brought into contact at step 130 with the substrate optionally having an insulating/dielectric layer between the substrate and the electrically conductive material. A thermal gradient can be applied to the electrically conductive material at step 132 and a voltage applied to the substrate at step 134. In some instances, the voltage is a gate voltage. In this manner, the electrical conductivity, thermoelectric power and/or thermal conductivity of the electrically conductive material can be tuned by surface passivation and field-effect gating.

In order to provide a better understanding of the process, and yet in no way limit the scope of the invention, an example of a process wherein the thermoelectric properties of n-type PbSe nanowires was altered is described below.

EXAMPLE

Figure 2A:
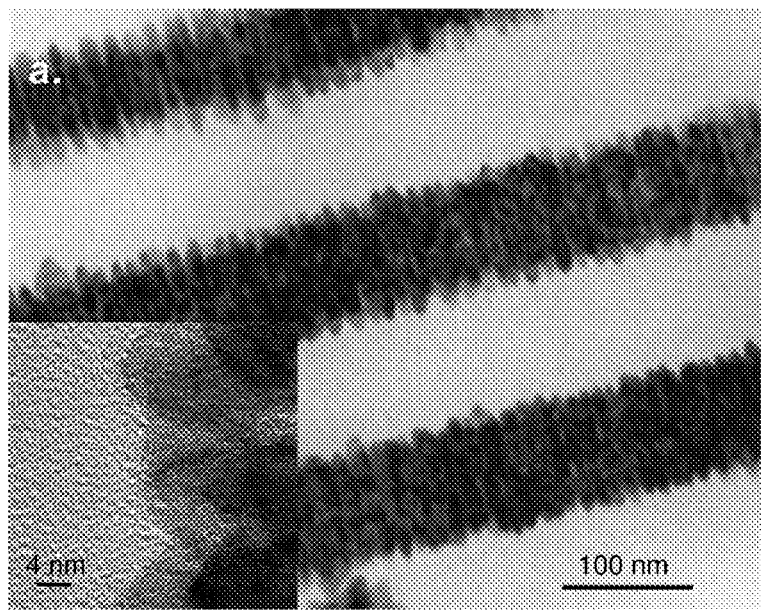
FIG. 2a is a transmission electron microscope (TEM) image of a solution phase synthesized PbSe nanowire, with an inset of a higher magnification shown in the bottom left corner of the image.

PbSe nanowires were formed via a solution phase synthesis. The nanowires had diameters ranging from 100 nm down to 50 nm, and lengths up to tens of microns. Transmission electron microscopy (TEM) images of the as-made nanowires are shown in FIG. 2a. The images illustrate the nanowires had extremely rough surfaces, probably due to the oriented nanoparticle attachment and overgrowth mechanism of growth. Despite the rough surfaces, high-resolution TEM (HRTEM) images, such as the one shown as the inset in FIG. 2a, reveal the single-crystalline nature of the nanowires.

Figure 3A:
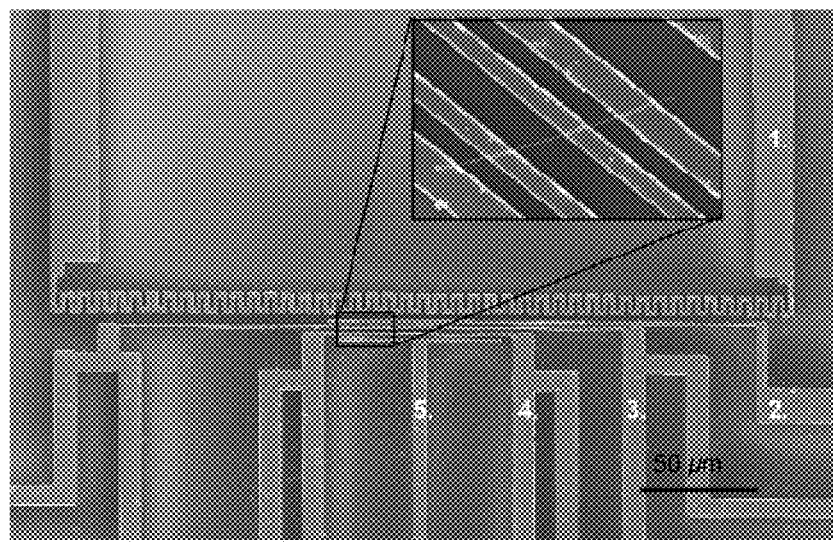
FIG. 3a is a scanning electron microscopy image of a circuit used for electric and thermoelectric power measurements of a PbSe nanowire.

The electrical properties of individual PbSe nanowires were measured using the circuit imaged in FIG. 3a. The circuit consists of a heater 1 for establishing a temperature gradient and four electrical probes 2-5 for measuring the conductivity and thermal voltage across the nanowire. Two of the electrical probes themselves have four leads and function simultaneously as temperature sensors. Such circuits were fabricated on top of nanowires dispersed on a conductive silicon wafer chip with a $SiN_x$ dielectric layer as shown in the inset of FIG. 3a. In addition, the electrical properties of the nanowires were modulated during measurement by applying a gate voltage to the insulated, underlying silicon substrate.

The as-synthesized nanowires were first dispersed in a chloroform suspension and cast by spin-coating onto a silicon substrate, which had been coated by a 600 nm $SiN_x$ film, at 2000 rpm. Immediately upon evaporation of the solvent, the substrate was coated with I-line photoresist. Standard photolithographic processing was used to pattern films of 1 nm/150 nm/35 nm Ti/Pd/Au, which were deposited by electron-beam evaporation. The metals were evaporated 5 minutes at a time, separated by 5 minute intervals, to prevent the nanowires from overheating. Finally the substrates were soaked in acetone for 30-60 minutes to dissolve the photoresist and liftoff the metal film.

Figure 2B:
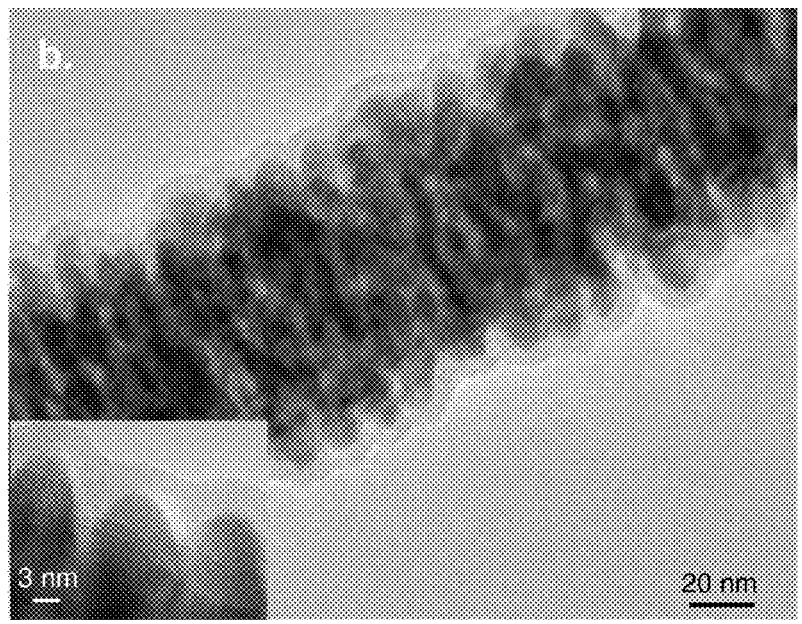
FIG. 2b is a TEM image of a PbSe nanowire coated with alumina, with an inset of a higher magnification shown in the bottom left corner of the image.

Due to the environmental sensitivity of the PbSe nanowires, their surfaces were passivated with a thin alumina film. The nanowires were first annealed in an $N_2$ environment at 700 mtorr and 200° C. for up to four hours. Atomic layer deposition (ALD) was used to deposit the alumina at 50° C. FIG. 2b and the inset show TEM and HRTEM images, respectively, of PbSe nanowires on a TEM grid that were coated with ALD-deposited alumina. As evidenced by the micrograph, this procedure deposited a conformal 6 nm coating of alumina without altering the morphology or microstructure of the nanowires.

Figure 3B:
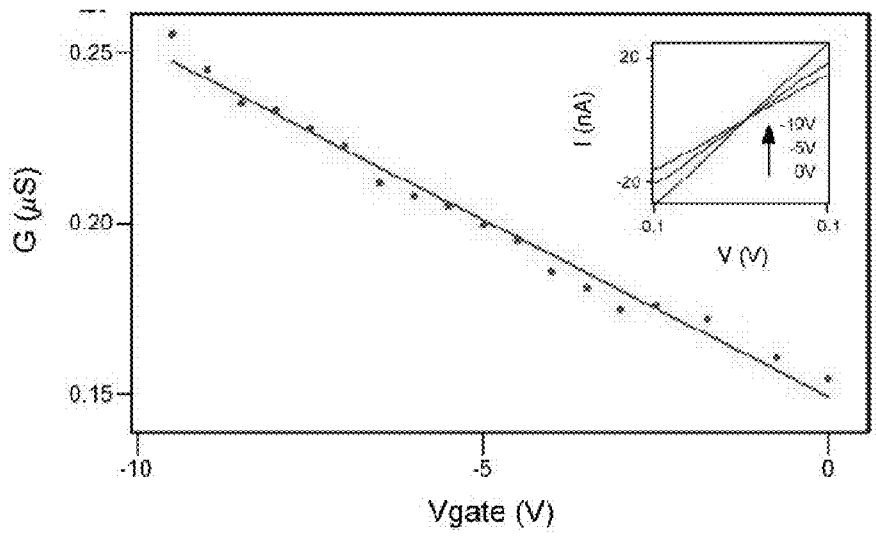
FIG. 3b is a graph illustrating the conductance of a monolithic PbSe nanowire as a function of gate voltage.
Figure 3C:
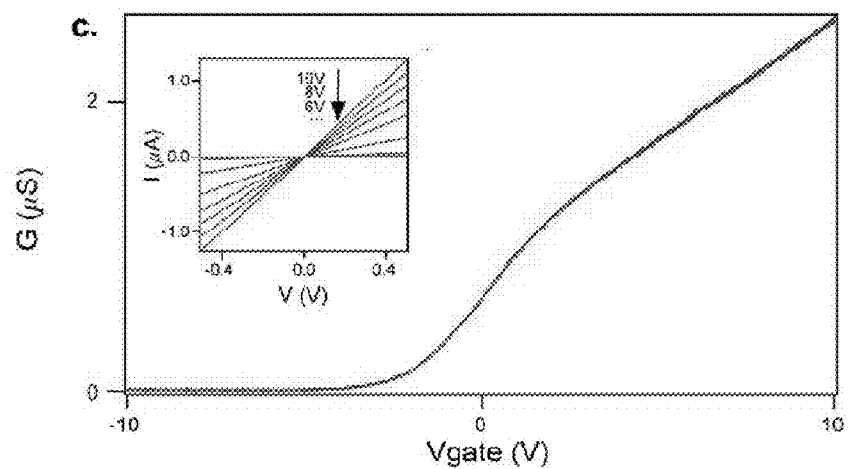
FIG. 3c is a graph illustrating conductance of a monolithic PbSe nanowire coated with an alumina layer as a function of gate voltage.

The electrical properties of the PbSe nanowires were measured on devices such as the one shown in FIG. 3a with a nanowire bridging all four metal contact lines, as shown in the inset. All four lines 2-5 were used to measure the four-point resistance of individual nanowires. FIGS. 3b and 3c show typical electrical transport behavior of single PbSe nanowire field-effect transistors before and after, respectively, being coated with alumina by atomic layer deposition (ALD). The current versus applied voltage plots at different gate voltage ($V_g$) values were linear, as shown in the insets in FIGS. 3b and 3c. The linearity of the current versus applied voltage indicates ohmic contacts between the metal and nanowire in both cases. Furthermore, while the typical two-point resistance of individual nanowires was several hundred kilo-ohms (kΩ), the values obtained by four-point measurements differed from these by less than one kΩ, suggesting minimal contact resistance. Single PbSe nanowires were able to conduct currents up to 10 μA without failure, corresponding to breakdown current density of approximately $5 \times 10^5$ A·cm$^{-2}$. As such, these values, along with the TEM observations, indicate that these devices comprise high quality, single crystalline nanowires with ohmic contacts.

One significant difference in the electrical transport behavior before and after the ALD alumina coating was applied to the PbSe nanowires was the evolution of conductance (G) with respect to $V_g$. As shown in FIGS. 3b and 3c the conductance of single nanowire transistors decreased and increased with increasing $V_g$ before and after alumina deposition, respectively. These opposite trends indicate a switch in the polarity of free charge carriers due to the alumina coating; that is, PbSe nanowires were p-type before and n-type after coating with alumina. Considering the narrow band gap and reactivity of PbSe, changes in the electron density at the surface, either due to adsorbed species or chemical reactions, could affect the carrier density or polarity within the nanowire. The ALD process could result in a positively charged $Al_2O_3$ film, and we contribute the change in carrier type to the effective gating from the coated $Al_2O_3$ layer.

The mobility of the nanowires can be extracted from the transconductance ($\Delta G/\Delta V_g$) and geometric factors derived from modeling the nanowire field-effect transistor as a cylindrical channel on a planar gate electrode. For two of the n-type PbSe nanowire devices, the drift mobilities were calculated as 76 (FIG. 3c) and 180 cm$^2$·V$^{-1}$·s$^{-1}$. The charge carrier concentration was measured as $1.8 \times 10^{18}$ cm$^{-3}$. The as-synthesized p-type nanowires, on the other hand, exhibit mobilities of about 5 cm$^2$·V$^{-1}$·s$^{-1}$. The data in FIG. 3b yield a mobility of 3 cm$^2$·V$^{-1}$·s$^{-1}$ and a carrier concentration of $6 \times 10^{18}$ cm$^{-3}$. Though not being bound by theory, it is postulated that the enhancement of mobility in alumina-coated samples is the result of the passivation of surface defects and charge trap states by the high quality ALD film. Although the highest mobility value measured for the PbSe nanowires is still an order of magnitude lower than observed values of the Hall mobility in bulk PbSe, it is by far the largest mobility reported for lead chalcogenide nanostructures. Further improvements in sample preparation and processing could augment these values. Additionally, it is appreciated that the model used to calculate the drift mobility from the transconductance provides only a lower bound of the actual value. Overall, field-effect gating of the PbSe nanowire devices changed their conductance by two orders of magnitude.

Figure 4A:
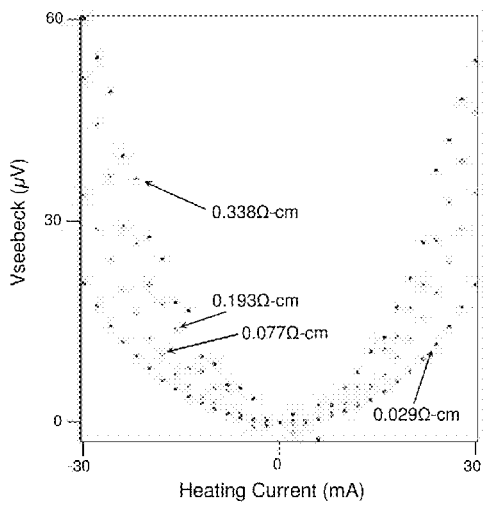
FIG. 4a is a graph illustrating the thermal voltages of a coated PbSe nanowire as a function of heater current taken at different resistivities as defined by the applied gate voltage.

To measure the thermoelectric power of individual nanowires, a current was passed through the heater 1 shown in FIG. 3a, which established a thermal gradient across the nanowire bridging the electrodes 2-5. The voltage measured across the two inner electrodes 3 and 4 in the temperature gradient is the Seebeck voltage ($V_{therm}$), from which the thermoelectric power, S, is calculated as $S=V_{therm}\Delta T$. FIG. 4a shows the absolute value of the thermoelectric power measurement from an alumina-coated PbSe nanowire. The measured $V_{therm}$ were plotted as a function of heating current, $I_{heat}$, applied to the heater. Each parabola corresponded to $V_{therm}$ measurements from the same nanowire under different applied $V_g$. The sign convention is such that negative $V_{therm}$ were measured for n-type samples due to the polarity of the majority charge carriers that transport heat are negative, i.e. $V_{them}>0$ when electrode 4 is cooler than electrode 3, as labeled in FIG. 3a. Negative values of $V_{therm}$ were obtained as a function of $I_{heat}$ and are plotted as absolute values in FIG. 4a.

The negative values of $V_{therm}$ are consistent with the charge carrier type determined by the transconductance measurements in FIG. 3c. The electrons responsible for charge conduction were driven down the temperature gradient established along the nanowire. The temperature is proportional to the heating power and thus proportional to $I_{heat}^2$ and $V_{therm}$ was estimated by a fit with polynomial function. The $\Delta T$ along the nanowire was measured between the same two electrodes used to obtain $V_{therm}$ and was calculated by calibration of the metal line four-point resistance at fixed global temperatures.

The observed absolute thermoelectric power, $S_{abs}$, was measured as a function of PbSe nanowire conductivity. As expected, the magnitude of $S_{abs}$ increased with sample resistance, as modulated by the gate electrode, shown in FIG. 4b. $S_{abs}$ ranged from 57 to 193 $\mu V \cdot K^{-1}$ under high to low $V_g$, respectively, and is comparable to reported values for thin film and bulk PbSe. The general expression for S is $$S = \frac{k_B}{e} \int \frac{E_F - E}{k_B T} \cdot \frac{\sigma(E)}{\sigma} dE \quad (1)$$

where $k_B$ is the Boltzmann constant, $E_F$ is the Fermi energy of the material, e is the electron charge, and $\sigma(E)$ is the electrical conductivity at a given electron energy E. Assuming that only electrons contribute to the thermoelectric power and that $E_F$ lies below the conduction band edge, the above equation can be written as $$S = \frac{k_B}{e} \left( \frac{E_F - E_C}{k_B T} \right) + A \quad (2)$$

where A represents a scattering factor of the semiconductor.

Varying $V_g$ changes the electrical conductivity by modulating the electron density in the conduction band, and hence $E_F$ of the nanowire. Using the general expression of $E_F$ and electron density, equation 2 can be simplified to $$S = C_1 (\ln N_c - \ln n + A) \quad (3)$$

where $N_c$ is the temperature-dependent effective density of states of the conduction band with effective mass $m_e^*$ at the band edge of PbSe and $C_1$ is a fitting parameter.

Figure 4B:
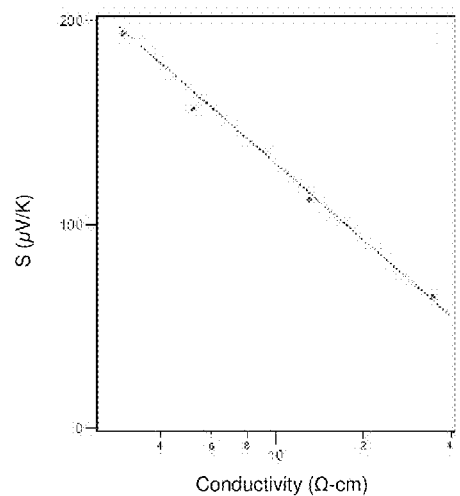
FIG. 4b is a graph illustrating the Seebeck coefficient as a function of conductivity of the coated PbSe nanowire.

The result of modulating $E_F$ in the nanowire by varying $V_g$, and the subsequent effect on the thermoelectric power, fits closely to the line predicted by equation 3, shown in FIG. 4b. Furthermore, the scattering factor can be calculated using the known electron mobility of 76 $cm^2 \cdot V^{-1} \cdot s^{-1}$ in the device and assuming $m_e^* \sim 0.05 \cdot m_0$ as A=1.5. This result is consistent with the value of A in bulk PbSe, suggesting that electron transport in the nanowire does not differ significantly from a classical system.

Figure 5A:
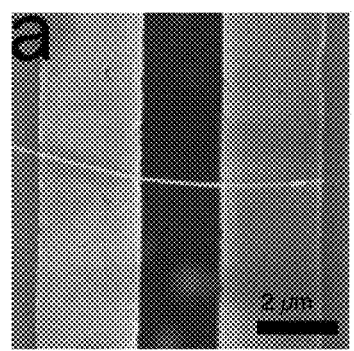
FIG. 5a is a scanning electron microscopy image of a PbSe nanowire bridging two suspended membranes of a microfabricated thermal conductivity measurement device.
Figure 5B:
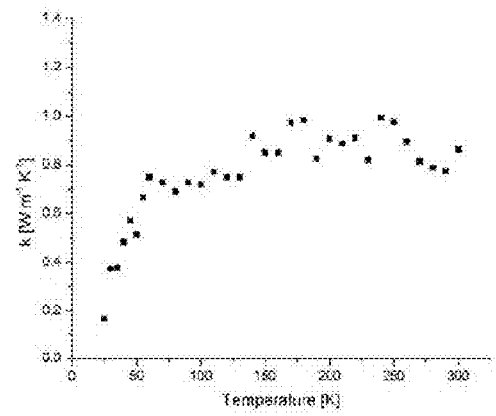
FIG. 5b is a graph illustrating the temperature-dependent thermal conductivity of a PbSe nanowire having a diameter of approximately 90 nanometers.

The thermal conductivity of individual nanowires with similar diameters was measured using suspended microfabricated membranes. Two suspended membranes were bridged by a single nanowire comprising the main heat transfer pathway between them, as shown for a ~90 nm PbSe nanowire in FIG. 5a. The measured thermal conductivity of the wire is about 0.8 $W \cdot m^{-1} \cdot K^{-1}$ as shown in FIG. 5b, which is a two-fold decrease from that of bulk PbSe at room temperature. In addition, the thermal conductivity at low temperature was decreased by over two orders of magnitude as compared to bulk. It is appreciated that the peak thermal conductivity typically found in bulk materials below ~50K is absent in this nanowire system as well. Not being bound by theory, it is postulated that the reduction in thermal conductivity is likely the result of faster rates of phonon scattering at the nanowire surface. In addition, the surface roughness may play a role in efficiently scattering intermediate and long wavelength phonon modes in PbSe.

Figure 5C:
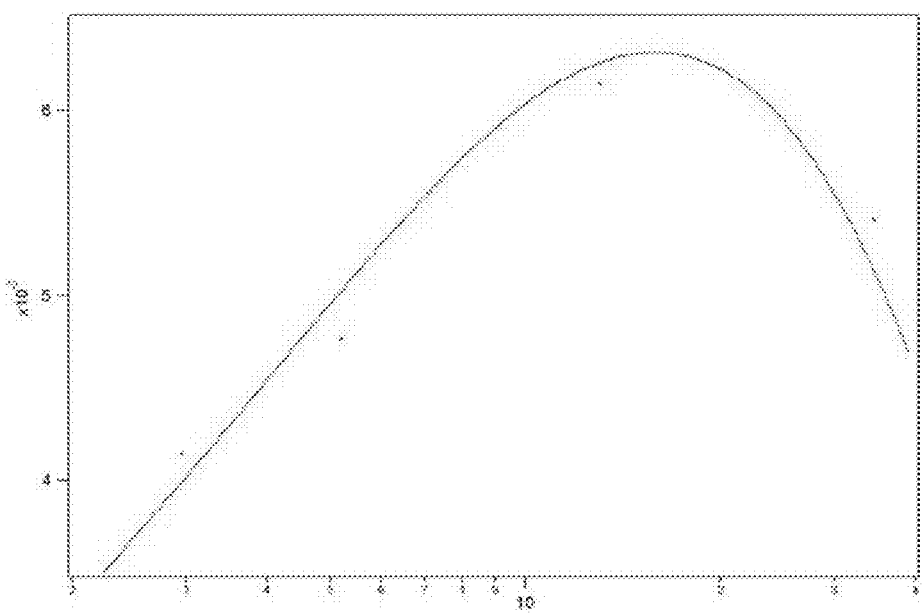
FIG. 5c is a graph illustrating the calculated ZT as a function of conductivity for PbSe nanowires.

By combining the relevant properties comprising ZT from the individual nanowire measurements, an estimate can be made of the figure of merit of single PbSe nanowires at this size scale. FIG. 5c plots ZT as a function of electrical conductance, and the line shown indicates the general trend. As expected, there is a maximum in ZT, which occurs around $G=16$ $S \cdot cm^{-1}$. ZT was effectively tuned from a minimum of 0.004 to 0.006, a 50% increase, corresponding to changes in $\sigma$ of a factor of two and in S of two orders of magnitude. These results are demonstrate field-effect modulation of the thermoelectric figure of merit.

Devices were wire-bonded onto a chip package and electrical measurements were performed in a screened chamber with a local heater. Four-point probe resistance measurements were performed using a MIO multifunction DAC card as a voltage source, and the current flowing through the nanowire (electrodes 2 and 5 in FIG. 3a) and voltage drop on the nanowire (electrodes 3 and 4) were monitored using a DL Instruments current preamplifier and Scientific Instrument voltage amplifier, respectively. Thermoelectric power measurements were done using a Keitheley source-measurement unit as a current source to resistively heat the microfabricated metal line, while the generated thermal voltage on the PbSe nanowire was monitored using a Keitheley nanovoltmeter. To determine the temperature difference along the nanowire, the resistance changes of the middle two electrodes (3 and 4 in FIG. 3a) were measured using two SRS lock-in amplifiers while current was applied to the heater line. The temperature-dependent resistance of the inner electrodes was determined in order to calibrate the temperature measurement on each end of the nanowire. The change in resistance of the metal lines was monitored as the temperature of the entire substrate was uniformly and slowly increased using a Lakeshore temperature controller in a Lakeshore ST-500 cryostat. The resulting curves were used to measure the temperature on each end of the nanowires during thermoelectric power measurements.

From the foregoing, it can be seen that the present invention provides a process for altering, changing and/or tuning the thermoelectric properties of electrically conductive materials. Having described the invention, however, many modifications thereto will become apparent to those skilled in the art to which it pertains without deviation from the spirit of the invention as defined by the scope of the appended claims. Although the example was given to aid in the understanding of the present invention, the example is not intended to limit the scope of the process. The scope of the invention is provided by the scope of the claims.

We claim:

1. A process for tuning thermoelectric properties of an electrically conductive material comprising:
   providing an electrically conductive material;
   providing a substrate;
   bringing the electrically conducting material into contact with the substrate;
   applying a thermal gradient to the electrically conducting material; and
   applying a gate voltage to the substrate.

2. The process of claim 1, wherein the electrically conductive material is a semiconductor material.

3. The process of claim 1, wherein the electrically conductive material is a nanostructure.

4. The process of claim 1, wherein the electrically conductive material is a semiconductor nanostructure containing a material selected from the group consisting of PbTe, PbSe, SnTe, ZnSb, $Bi_2Te_3$, $Bi_2Se_3$, SiGe, CoSb, $MgSi_2$, ZnO, ZrNiSn, HfNiSn, TiNiSn and combinations thereof.

5. The process of claim 4, wherein the semiconductor nanostructure is selected from the group consisting of a monolithic nanowire, a superlattice nanowire and a core-shell nanowire.

6. The process of claim 1, wherein the substrate is made from a semiconductor material.

7. The process of claim 6, further comprising applying an insulating layer onto the substrate, the insulating layer being between the substrate and the electrically conductive material.

8. The process of claim 7, wherein the semiconductor substrate and the electrically conductive material are both in contact with the insulating layer.

9. The process of claim 1, further comprising passivating a surface of the electrically conductive material.

10. The process of claim 9, wherein the passivating is applying a coating to the surface of the electrically conductive material.

11. The process of claim 9, wherein the passivating is annealing the surface of the electrically conductive material.

12. A process for altering thermoelectric properties of an electrically conductive material comprising:
    providing an electrically conductive nanostructure;
    providing a substrate;
    applying an insulating layer to the substrate;
    bringing the electrically conductive nanostructure into contact with the insulating layer;
    applying a thermal gradient to the electrically conductive nanostructure; and
    applying a gate voltage to the substrate.

13. The process of claim 12, wherein the electrically conductive nanostructure is selected from the group consisting of a monolithic nanowire, a superlattice nanowire and a core-shell nanowire.

14. The process of claim 13, wherein the electrically conductive nanostructure is made from a semiconductor material selected from the group consisting of PbTe, PbSe, SnTe, ZnSb, $Bi_2Te_3$, $Bi_2Se_3$, SiGe, CoSb, $MgSi_2$, ZnO, ZrNiSn, HfNiSn and TiNiSn.

15. The process of claim 12, wherein the electrically conductive nanostructure is a superlattice nanowire selected from the group consisting of $Bi_2Te_3$/PbSe and Si/SiGe.

16. The process of claim 12, wherein the electrically conductive nanostructure is an n-type semiconductor material.

17. The process of claim 12, wherein the electrically conductive nanostructure is a p-type semiconductor material.

18. The process of claim 12, wherein the substrate is made from a semiconductor material.

19. The process of claim 12, further comprising passivating a surface of the electrically conductive nanostructure.

20. The process of claim 19, wherein the passivating is applying a coating to the surface of the electrically conductive nanostructure.

21. The process of claim 19, wherein the passivating is annealing of the surface of the electrically conductive nanostructure.

22. A process for altering thermoelectric properties of a material comprising:
    providing a semiconductor nanostructure;
    passivating a surface of the semiconductor nanostructure;
    providing a semiconductor substrate;
    placing the semiconductor nanostructure in contact with the semiconductor substrate;
    applying a thermal gradient to the semiconductor nanostructure; and
    applying a gate voltage to the semiconductor substrate.

* * * * *